United States Patent [19]

Chazono et al.

[11] Patent Number: 5,296,425
[45] Date of Patent: Mar. 22, 1994

[54] CERAMIC MATERIALS OF IMPROVED DIELECTRIC CONSTANTS, AND CAPACITORS FABRICATED THEREFROM

[75] Inventors: Hirokazu Chazono, Yoshiokamachi; Yasuyuki Inomata; Kazuyuki Shibuya, both of Takasaki; Katsuyuki Horie, Misatomachi, all of Japan

[73] Assignee: Taiyo Yuden Co., Ltd., Tokyo, Japan

[21] Appl. No.: 98,640

[22] Filed: Jul. 28, 1993

[30] Foreign Application Priority Data

Jul. 31, 1992 [JP] Japan ................................ 4-225066
Aug. 31, 1992 [JP] Japan ................................ 4-257376

[51] Int. Cl.$^5$ ............................................. C04B 35/49
[52] U.S. Cl. ......................................... 501/138; 501/139
[58] Field of Search ................................. 501/138, 139

[56] References Cited

U.S. PATENT DOCUMENTS

| | | |
|---|---|---|
| 3,920,781 | 11/1975 | Eror et al. ............................. 264/61 |
| 4,535,064 | 8/1985 | Yoneda ................................. 501/139 |
| 5,219,812 | 10/1993 | Doi et al. ............................. 501/139 |

FOREIGN PATENT DOCUMENTS 3800198 7/1988 Fed. Rep. of Germany .
3289709 11/1988 Japan .
3-126664 5/1991 Japan .

*Primary Examiner*—Mark L. Bell
*Assistant Examiner*—Deborah Jones
*Attorney, Agent, or Firm*—Woodcock Washburn Kurtz Mackiewicz & Norris

[57] ABSTRACT

A dielectric ceramic composition consists essentially of 100 mole parts of a major ingredient expressed by the formula, $$(Ba_{1-x}Ca_x)(Ti_{1-y}Zr_y)O_3,$$

where x is a numeral in the range of 0.01 to 0.10, and y is a numeral in the range of 0.10 to 0.24. To this major ingredient there are added from 0.10 to 2.0 mole parts of an erbium compound, and from 0.03 to 0.30 mole part of a manganese compound. Optionally, for the provision of low temperature sinterable ceramic compositions, there are also added from 0.03 to 0.40 mole part of a zinc compound and from 0.01 to 0.20 mole part of a silicon compound. Monolithic, solid dielectric capacitors are also disclosed which have ceramic bodies formulated from the above compositions.

4 Claims, 1 Drawing Sheet

CERAMIC MATERIALS OF IMPROVED DIELECTRIC CONSTANTS, AND CAPACITORS FABRICATED THEREFROM

BACKGROUND OF THE INVENTION

This invention relates to dielectric ceramic compositions and to capacitors having a single or multiple layered ceramic body of such compositions.

A variety of dielectric ceramic compositions have been suggested and used for capacitors with a view to greater capacitance. Among such known compositions are those composed primarily of barium titanate ($BaTiO_3$), or of a compound obtained by partly substituting calcium (Ca) for barium (Ba), and zirconium (Zr) for titanium (Ti), of $BaTiO_3$. It has also been known to add manganese compounds to such compositions. Ceramic capacitors of these known compositions possess specific dielectric constants of up to 14,000 or so.

There are, however, strong, consistent demands from electric and allied industries for dielectric ceramic capacitors of even greater capacitance and other performance characteristics. One obvious solution to the problem of how to increase the capacitance of monolithic ceramic capacitors is to reduce the thickness of the ceramic body between the pair of electrodes. This solution works only to a limited extent, however, because too much reduction in the thickness of the ceramic body would make the voltage withstanding capabilities of the capacitors inconveniently low. The only practical solution is therefore to use dielectric ceramics of higher specific dielectric constants and higher voltage withstanding capabilities than those attainable with conventional materials including those composed principally of $BaTiO_3$ or the like.

Another inconvenience heretofore encountered in the manufacture of ceramic capacitors is that some ceramic materials have to be sintered at temperatures as high as 1300° C. or more. Such high sintering temperatures have required the use of palladium as a material of electrodes in cosintering these electrodes with the ceramic bodies. Palladium is currently very expensive and has added substantially to the costs of ceramic capacitors. The advent of ceramic materials that are sinterable at lower temperatures has been awaited to enable use of less expensive electrode materials.

SUMMARY OF THE INVENTION

The present invention seeks to provide dielectric ceramic compositions that meet all the requirements pointed out above, and capacitors having ceramic bodies of such compositions.

Briefly, the invention provides a dielectric ceramic composition consisting essentially of 100 mole parts of a major ingredient expressed by the formula, $$(Ba_{1-x}Ca_x)(Ti_{1-y}Zr_y)O_3,$$

where x is a numeral in the range of about 0.01 to about 0.10, and y a numeral in the range of about 0.10 to about 0.24, from about 0.10 to about 2.0 mole parts of an erbium compound, and from about 0.03 to about 0.30 mole part of a manganese compound. Optionally, there are added not more than 0.40 mole part of a zinc compound, and not more than 0.20 mole part of a silicon compound.

The above summarized compositions of this invention provides ceramic materials having a maximum specific dielectric constant of 14,000 or more in a temperature range of −25° to +85° C., a dielectric loss of not more than 1.5 percent at 20° C., and a resistivity of $5 \times 10^6$ megohmcentimeters at 150° C.

An erbium compound such as erbium oxide, one of the two essential additives, functions to make the average crystal grain size as small as, say, five micrometers or less and to prevent the creation of any exceptionally large grains. Thus the erbium compound contributes materially to improvement in the voltage withstanding capabilities and specific dielectric constants of the ceramic materials according to the invention. The ceramic materials of such reduced grain size lend themselves to most advantageous use in monolithic, multilayered capacitors in which each ceramic layer is very thin.

Zinc and silicon compounds, the two optional additives, function to make the compositions sinterable at lower temperatures in the production of ceramic materials. Especially when used in proportions of 0.03–0.40 mole part and 0.01–0.20 mole part, respectively, with respect to 100 mole parts of the major ingredient, the zinc compound and silicon compound makes the compositions sinterable at 1200° C. or less, so that in the fabrication of capacitors of these compositions, the electrodes can be made from, for example, a mixture of palladium and silver, which mixture is less expensive than palladium only.

The above and other features and advantages of this invention and the manner of realizing them will become more apparent, and the invention itself will be best understood, from a study of the following description and appended claims taken together with the attached drawings.

DETAILED DESCRIPTION OF THE INVENTION

Figure 1:
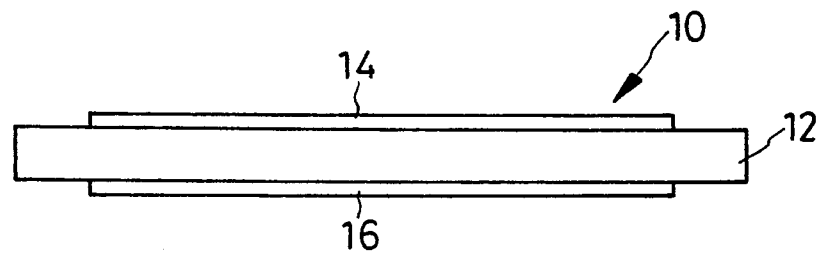
FIG. 1 is an elevation of a monolithic, single layered, dielectric ceramic capacitor to which the ceramic compositions of this invention are applicable.
Figure 2:
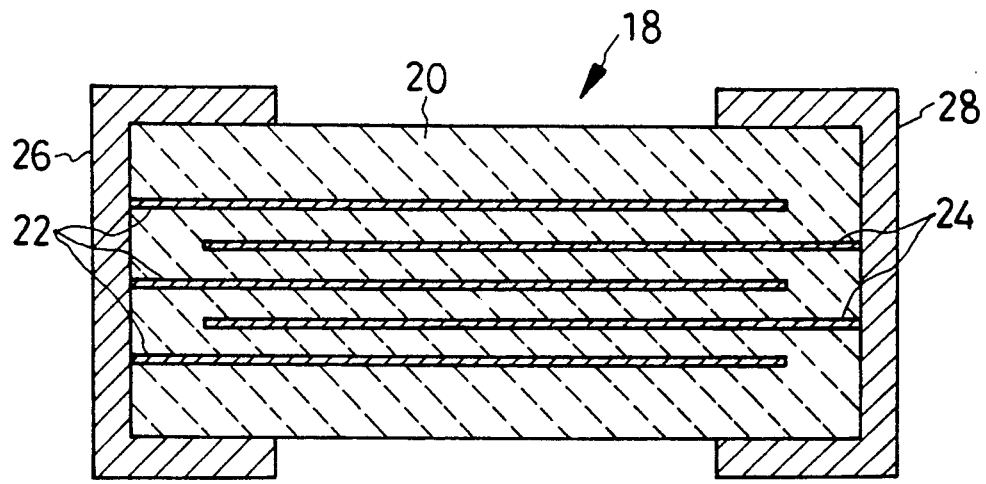
FIG. 2 is a section through a monolithic, multilayered, dielectric ceramic capacitor to which the ceramic compositions of this invention are also applicable.

The dielectric ceramic compositions according to the invention, set forth in the foregoing summary of the invention, are suitable for use in the fabrication of monolithic capacitors such as those shown in FIGS. 1 and 2. The monolithic, single layered ceramic capacitor 10 of FIG. 1 represents one of many such capacitors of like construction made in the subsequent Example I of the invention. This capacitor 10 has a dislike body 12 of dielectric ceramic material according to the invention, and a pair of film electrodes 14 and 16 formed on the opposite major surfaces of the ceramic body 12.

The multilayered ceramic capacitor 18 of FIG. 2 represents one of many such capacitors made in Example II of the invention. The capacitor 18 has a dielectric ceramic body 20 of the compositions according to the invention, two groups of film electrodes 22 and 24 embedded in the ceramic body 20 so as to divide the same into several layers, and a pair of conductive terminations 26 and 28 formed on the opposite sides of the ceramic body 20. The two groups of film electrodes 22 and 24 extend from both sides of the ceramic body 20 toward, and terminate short of, the opposite sides of the ceramic body and so have an overlapping, parallel spaced relationship to each other. The conductive terminations 26 and 28 contact the respective groups of film electrodes 22 and 24. Essentially, therefore, this multilayered capacitor 18 may be thought of as having but two electrodes in contact with the ceramic body 20.

EXAMPLE I

There were fabricated forty three different sets of test capacitors of the FIG. 1 construction, some having their ceramic bodies formulated in accordance with the compositions of this invention, and others not. Then the fabricated test capacitors were evaluated in terms of maximum specific dielectric constant, dielectric loss, resistivity, average crystal grain size, and freedom from outsize crystal grains. Table 1 lists the compositions of the ceramic bodies of all the test capacitors fabricated.

The major ingredient of the ceramic compositions according to this invention was previously defined by the general formula, $(Ba_{1-x}Ca_x)(Ti_{1-y}Zr_y)O_3$. Thus, in Table 1, various values of the subscripts x and y in the formula are given to indicate the specific compositions of the major ingredient employed in Tests Nos. 1-43.

The ceramic compositions of this invention also include minor proportions of an erbium compound and a manganese compound, and, optionally, of a zinc compound and a silicon compound. In Tests Nos. 1-43 erbium oxide ($Er_2O_3$) was employed as erbium compound, manganese oxide (MnO) as manganese compound, zinc oxide (ZnO) as zinc compound, and silicon oxide ($SiO_2$) as silicon compound. Table 1 specifies the amounts, in mole parts, of these additives with respect to 100 mole parts of the major ingredient.

TABLE 1

| Test No. | Major Ingredient (100 mole parts) | | Additives (mole part) | | | |
|---|---|---|---|---|---|---|
| | x | y | $Er_2O_3$ | MnO | ZnO | $SiO_2$ |
| 1 | 0.05 | 0.19 | 0.30 | 0.10 | — | — |
| 2 | 0.03 | 0.10 | 2.00 | 0.03 | — | — |
| 3 | — | 0.15 | 0.40 | 0.03 | — | — |
| 4 | 0.12 | 0.20 | 0.50 | 0.05 | — | — |
| 5 | 0.10 | 0.19 | 0.35 | 0.08 | — | — |
| 6 | 0.07 | 0.08 | 0.40 | 0.10 | — | — |
| 7 | 0.07 | 0.25 | 0.35 | 0.07 | — | — |
| 8 | 0.07 | 0.24 | 0.30 | 0.05 | — | — |
| 9 | 0.06 | 0.18 | — | 0.04 | — | — |
| 10 | 0.06 | 0.18 | 0.10 | 0.09 | — | — |
| 11 | 0.07 | 0.20 | 2.10 | 0.10 | — | — |
| 12 | 0.07 | 0.19 | 0.20 | 0.02 | — | — |
| 13 | 0.07 | 0.18 | 0.50 | 0.32 | — | — |
| 14 | 0.08 | 0.19 | 0.40 | 0.30 | — | — |
| 15 | 0.10 | 0.20 | 0.35 | 0.10 | — | — |
| 16 | 0.01 | 0.18 | 0.42 | 0.12 | — | — |
| 17 | 0.05 | 0.19 | 0.44 | 0.09 | — | — |
| 18 | 0.03 | 0.16 | 0.75 | 0.08 | — | — |
| 19 | 0.07 | 0.18 | 0.62 | 0.05 | — | — |
| 20 | 0.08 | 0.19 | 0.53 | 0.15 | — | — |
| 21 | 0.05 | 0.19 | 0.30 | 0.10 | 0.30 | 0.02 |
| 22 | 0.03 | 0.10 | 2.00 | 0.03 | 0.20 | 0.05 |
| 23 | — | 0.15 | 0.40 | 0.03 | 0.10 | 0.10 |
| 24 | 0.12 | 0.20 | 0.50 | 0.05 | 0.05 | 0.05 |
| 25 | 0.10 | 0.19 | 0.35 | 0.08 | 0.25 | 0.15 |
| 26 | 0.07 | 0.08 | 0.40 | 0.10 | 0.05 | 0.03 |
| 27 | 0.07 | 0.25 | 0.35 | 0.07 | 0.35 | 0.15 |
| 28 | 0.07 | 0.24 | 0.30 | 0.05 | 0.30 | 0.07 |
| 29 | 0.06 | 0.18 | — | 0.04 | 0.03 | 0.15 |
| 30 | 0.06 | 0.18 | 0.10 | 0.09 | 0.10 | 0.05 |
| 31 | 0.07 | 0.20 | 2.10 | 0.10 | 0.35 | 0.02 |
| 32 | 0.07 | 0.19 | 0.20 | 0.02 | 0.25 | 0.05 |
| 33 | 0.07 | 0.18 | 0.50 | 0.32 | 0.05 | 0.10 |
| 34 | 0.08 | 0.19 | 0.40 | 0.30 | 0.30 | 0.05 |
| 35 | 0.10 | 0.20 | 0.35 | 0.10 | 0.01 | 0.05 |
| 36 | 0.10 | 0.20 | 0.35 | 0.30 | 0.03 | 0.05 |
| 37 | 0.01 | 0.18 | 0.52 | 0.12 | 0.42 | 0.10 |
| 38 | 0.01 | 0.18 | 0.30 | 0.10 | 0.40 | 0.07 |
| 39 | 0.05 | 0.19 | 0.44 | 0.09 | 0.05 | — |
| 40 | 0.05 | 0.19 | 0.44 | 0.09 | 0.30 | 0.01 |
| 41 | 0.06 | 0.18 | 0.10 | 0.09 | 0.20 | 0.21 |
| 42 | 0.03 | 0.16 | 0.75 | 0.08 | 0.10 | 0.20 |
| 43 | 0.07 | 0.18 | 0.62 | 0.05 | 0.30 | 0.02 |

According to Table 1, the major ingredient of the ceramic bodies of the capacitors of Test No. 1 was

$(Ba_{0.95}Ca_{0.05})(Ti_{0.81}Zr_{0.19})O_3$.

This major ingredient of Test No. 1 was prepared by intermingling barium carbonate ($BaCO_3$), calcium carbonate ($CaCO_3$), $TiO_2$ and $ZrO_2$ in the required molar ratio of the elements included in the major ingredient and by firing the mixture.

To 100 mole parts (1000.00 grams) of this major ingredient were added 0.30 mole part (4.85 grams) $Er_2O_3$ and 0.10 mole part (0.03 gram) MnO. This mixture was ball milled for 15 hours and then dried at 150° C. for three hours. There was thus obtained in finely divided form the ceramic material for the Test No. 1 capacitors.

Then the above obtained ceramic material was admixed with an organic binder, and the admixture was stirred into a slurry. Then this slurry was pressed into disks each sized 10 millimeters in diameter and 0.4 millimeter in thickness. Then the disks were air fired at 1300° C. for two hours, thereby obtaining the ceramic bodies 12 of the Test No. 1 capacitors 10.

For the creation of the pairs of electrodes 14 and 16 on the ceramic bodies 12, a silver paste, free from frits, was printed on their opposite major surfaces. Then the printings were baked at 800° C. The fabrication of the Test No. 1 capacitors was thus completed.

The capacitors of Tests Nos. 2-20 were made through the same procedure as above except, of course, for the compositions of the ceramic bodies 12. Substantially the same procedure was also followed for the production of the Tests Nos. 21-43 capacitors except that the slurries were pressed into disks 0.6 millimeter thick, and that the pressings were fired at 1200° C.

Then all the capacitors of Tests Nos. 1-43 were tested as to their maximum specific dielectric constants, dielectric losses, resistivities, average crystal grain size, and freedom from outsize grains. The following methods were employed for these characteristics:

Maximum Specific Dielectric Constant

Each set of test capacitors were introduced into a thermostatic vessel, in which their maximum capacitances were measured by an impedance analyzer in a temperature range of from −25° to +85° C. The maximum specific dielectric constants were computed from the maximum capacitances and the size of the ceramic bodies.

Dielectric Loss

The dielectric losses were measured at 20° C.

Resistivity

Resistance between the pair of electrodes 14 and 16 of each test capacitor was measured after the application of a direct voltage of 100 volts for 20 seconds and at a temperature of 150° C. Then the resistivity was computed from the measured resistance value and the size of each test capacitor.

Average Crystal Grain Size

Photographs, magnified 2000 or 5000 times, of the surfaces of each fired ceramic body, before the creation of the electrodes 14 and 16, were taken at five randomly selected spots under a scanning electron microscope. From each of these photographs the sizes of 200 randomly chosen crystal grains were measured, and the measurements were averaged.

Freedom from Outside Crystal Grains

The surfaces of each fired ceramic body, before the creation of the electrodes 14 and 16, were observed under an electron microscope, with a magnification of 100 times, for freedom from any crystal grains approximately ten times or more in size than the average.

Table 2 gives the characteristics of the test capacitors as measured by the above described methods. Outsize crystal grains were found only in the capacitors of Tests Nos. 3, 9 and 29, so that freedom from outsize grains is not indicated in the table.

TABLE 2

| | Capacitor Characteristics | | | |
| Test No. | Maximum Specific Dielectric Constant | Dielectric Loss (%) | Resistivity (megohm − cm) | Grain Size (micron) |
| --- | --- | --- | --- | --- |
| 1 | 22,000 | 0.42 | $1.1 \times 10^7$ | 3.6 |
| 2 | 20,500 | 1.36 | $9.0 \times 10^6$ | 3.3 |
| 3 | 12,500 | 1.20 | $7.2 \times 10^6$ | 0.9 |
| 4 | 12,300 | 0.26 | $9.6 \times 10^6$ | 2.3 |
| 5 | 15,500 | 0.34 | $1.0 \times 10^7$ | 2.5 |
| 6 | 13,900 | 1.80 | $5.3 \times 10^6$ | 2.4 |
| 7 | 11,300 | 0.10 | $1.0 \times 10^7$ | 1.9 |
| 8 | 15,100 | 0.11 | $9.1 \times 10^6$ | 2.1 |
| 9 | 20,900 | 1.13 | $8.7 \times 10^5$ | 4.1 |
| 10 | 21,500 | 1.02 | $6.8 \times 10^6$ | 3.8 |
| 11 | 10,400 | 0.29 | $7.5 \times 10^6$ | 1.6 |
| 12 | 18,900 | 0.85 | $2.9 \times 10^6$ | 3.2 |
| 13 | 12,300 | 0.75 | $3.8 \times 10^6$ | 2.4 |
| 14 | 16,100 | 0.42 | $8.6 \times 10^6$ | 2.6 |
| 15 | 18,900 | 0.40 | $1.3 \times 10^7$ | 3.0 |
| 16 | 14,800 | 0.41 | $9.8 \times 10^6$ | 2.4 |
| 17 | 23,300 | 0.60 | $1.1 \times 10^7$ | 3.3 |
| 18 | 24,000 | 1.00 | $8.8 \times 10^6$ | 4.2 |
| 19 | 18,800 | 0.82 | $9.4 \times 10^6$ | 3.6 |
| 20 | 17,300 | 0.39 | $9.9 \times 10^6$ | 2.7 |
| 21 | 23,500 | 0.33 | $8.0 \times 10^6$ | 3.3 |
| 22 | 21,500 | 1.30 | $7.0 \times 10^6$ | 3.4 |
| 23 | 13,000 | 1.17 | $6.2 \times 10^6$ | 2.4 |
| 24 | 12,500 | 0.24 | $9.1 \times 10^6$ | 2.6 |
| 25 | 17,500 | 0.27 | $7.5 \times 10^6$ | 3.0 |
| 26 | 13,200 | 1.70 | $5.1 \times 10^6$ | 2.8 |
| 27 | 10,300 | 0.12 | $6.5 \times 10^6$ | 2.7 |
| 28 | 16,600 | 0.10 | $5.6 \times 10^6$ | 2.6 |
| 29 | 21,300 | 1.10 | $8.7 \times 10^5$ | 3.3 |
| 30 | 22,500 | 0.99 | $5.8 \times 10^6$ | 3.1 |
| 31 | 12,000 | 0.20 | $5.2 \times 10^6$ | 1.9 |
| 32 | 21,900 | 0.78 | $1.2 \times 10^6$ | 5.2 |
| 33 | 12,500 | 0.73 | $3.2 \times 10^6$ | 1.7 |
| 34 | 19,000 | 0.33 | $5.6 \times 10^6$ | 2.8 |
| 35 | Not coherently bonded on firing. | | | |
| 36 | 15,800 | 0.72 | $8.6 \times 10^6$ | 2.7 |
| 37 | 12,000 | 0.52 | $1.1 \times 10^7$ | 2.6 |
| 38 | 15,200 | 0.48 | $5.8 \times 10^6$ | 2.5 |
| 39 | Not coherently bonded on firing. | | | |
| 40 | 25,000 | 0.51 | $8.6 \times 10^6$ | 4.2 |
| 41 | 18,000 | 1.08 | $3.8 \times 10^6$ | 3.1 |
| 42 | 21,000 | 0.97 | $8.5 \times 10^6$ | 3.3 |
| 43 | 20,300 | 0.73 | $6.4 \times 10^6$ | 3.0 |

It will be observed from Table 1 that the maximum specific dielectric constants of the Test No. 1 capacitors, for instance, averaged 22,000, their dielectric losses 0.42 percent, their resistivities $1.1 \times 10^7$ megohm-centimeters, and their average grain size 3.6 micrometers.

Before proceeding further with the examination of Table 2, the criteria of acceptability may be established as follows for the four properties in question of the capacitors according to this invention:

Maximum specific dielectric constant, not less than 14,000.

Dielectric loss, not more than 1.5 percent.

Resistivity, not less than $5 \times 10^6$ megohm-centimeters.

Average grain size, not more than five micrometers.

A reconsideration of Table 2 in light of the above established criteria of favorable capacitor characteristics will reveal that the capacitors of Tests Nos. 1, 2, 5, 8, 10, 14–20, 21, 22, 25, 28, 30, 34, 36, 38, 40, 42 and 43 come up to the criteria. No outsize crystal grains were found in these tests, either. The corresponding ceramic compositions of Table 1 fall within the scope of this invention. The capacitors of Tests Nos. 3, 4, 6, 7, 9, 11–13, 23, 24, 26, 27, 29, 31, 32, 33, 37 and 41 do not meet the criteria, so that the corresponding ceramic compositions of Table 1 are outside the scope of the invention.

As indicated in Table 2, the disks of Tests Nos. 35 and 39 were not coherently bonded on firing at 1200° C. However, these disks were coherently bonded on firing at 1300° C., as in Tests Nos. 1–20, and the resulting ceramic bodies possessed the required characteristics. The ceramic compositions of Tests Nos. 35 and 39 are therefore within the scope of this invention.

Now, let us more closely study the ceramic compositions of Table 1 and the corresponding capacitor characteristics of Table 2 in order to define the scope of the invention. First, concerning the major ingredient, $(Ba_{1-x}Ca_x)(Ti_{1-y}Zr_y)O_3$, the value of x was set at zero in Tests Nos. 3 and 23. The maximum specific dielectric constants of the resulting capacitors fell short of the criterion of not less than 14,000, and outside grains existed in Test No. 3. All the desired characteristics were obtained when the value of x was set at 0.01 as in Tests Nos. 16 and 38. The lowest allowable value of x is therefore 0.01.

The value of x was set at 0.12 in Tests Nos. 4 and 24. The maximum specific dielectric constants of the resulting capacitors fell short of the criterion. All the desired characteristics were obtained when the value of x was set at 0.10 as in Tests Nos. 5, 15, 25 and 35. The highest allowable value of x is therefore 0.10.

The value of y in the formula of the major ingredient was set at 0.08 in Tests Nos. 6 and 26. The resulting capacitors did not meet the maximum specific dielectric constant and dielectric loss criteria. All the criteria were met when the value of y was increased to 0.10 as in Tests Nos. 2 and 22. The lowest allowable value of y is therefore 0.10.

The value 0.25 chosen for y in Tests Nos. 7 and 27 was too high because the maximum specific dielectric constant of the resulting capacitors was less than the criterion. All the criteria were met when the value of y was set at 0.24 as in Tests Nos. 8 and 28. The upper limit of y is therefore 0.24.

As for the proportions of the additives, $Er_2O_3$, MnO, ZnO and $SiO_2$, the Tests Nos. 9 and 29 compositions did not include $Er_2O_3$. The resulting ceramic bodies of these tests both contained outsize crystal grains, and the capacitors of Test No. 29 did not meet the resistivity criterion. All the criteria were met, and no outsize grains found, when 0.10 mole part $Er_2O_3$ was included as in Tests Nos. 10 and 30. The lower limit of the proportion of $Er_2O_3$ is therefore 0.10 mole part with respect to 100 mole parts of the major ingredient.

The maximum specific dielectric constants of the Tests Nos. 11 and 31 capacitors fell short of the criterion as they contained 2.10 mole parts $Er_2O_3$. Containing 2.00 mole parts $Er_2O_3$, the Tests Nos. 2 and 22 capacitors satisfied all the criteria, so that the upper limit of the proportion of $Er_2O_3$ is 2.00 mole parts with respect to 100 mole parts of the major ingredient.

The Tests Nos. 12 and 32 compositions contained 0.02 mole part MnO, and the resulting capacitors fell short of the resistivity criterion. All the criteria were met when 0.02 mole part MnO was included as in Tests Nos. 2 and 22. The lower limit of the proportion of MnO is therefore 0.03 mole part with respect to 100 mole parts of the major ingredient.

The Tests Nos. 13 and 33 compositions contained 0.32 mole part MnO, and the resulting capacitors fell short of the maximum specific dielectric constant and resistivity criteria. All the criteria were met when 0.30 mole part MnO was included as in Tests Nos. 14 and 34. The upper limit of the proportion of MnO is therefore 0.30 mole part with respect to 100 mole parts of the major ingredient.

The other two additives, ZnO and $SiO_2$, are optional and may, or may not, be included in the ceramic compositions according to the invention. However, in order to make the ceramic compositions sinterable at 1200° C. or less, ZnO may be added in proportions of from about 0.03 to 0.40 mole part, and $SiO_2$ in proportions of from about 0.01 to about 0.20 mole part, with respect to 100 parts of the major ingredient. Tables 1 and 2 provide proofs to this effect, as discussed in detail hereafter.

As mentioned previously, the sintering temperature of the ceramic bodies was 1300° C. in Tests Nos. 1–20, in which the ceramic compositions contained neither ZnO nor $SiO_2$, and 1200° C. in Tests Nos. 21–43 in which the ceramic compositions contained both of these compounds. Test No. 35 indicates that the capacitor bodies were not coherently bonded on firing at 1200° when 0.01 mole part ZnO was included. However, the capacitor bodies were coherently bonded on firing at the same temperature, and the resulting capacitors possessed all the desired characteristics, when 0.03 mole part ZnO was added as in Test No. 36. The preferred lower limit of the proportion of ZnO is therefore 0.03 mole part, although of course the lower limit may be less, or even zero, if the sintering temperature can be higher, say, 1300° C.

The Test No. 37 composition contained 0.42 mole part ZnO, and the maximum specific dielectric constant of the resulting capacitors was less than the above established criterion. All the criteria were met, however, when the proportion of ZnO was reduced to 0.30 mole part as in Test No. 38. The upper limit of the proportion of ZnO is therefore 0.40 mole part.

The Test No. 39 composition contained no $SiO_2$, and the resulting capacitor bodies were not densely sintered on firing at 1200° C. However, when 0.01 mole part of $SiO_2$ was included as in Test No. 40, the capacitor bodies were densely sintered on firing at the same temperature, and the resulting capacitors gained all the desired characteristics. The preferred lower limit of the proportion of $SiO_2$ is therefore 0.01 mole part, although here again the lower limit may be less, or even zero, if the sintering temperature can be 1300° or so.

The Test No. 41 composition contained 0.21 mole part $SiO_2$, and the resistivity of the resulting capacitors was less than the criterion. However, when the $SiO_2$ proportion was decreased to 0.20 mole part as in Test No. 42, all the criteria were satisfied. The upper limit of the $SiO_2$ proportion is therefore 0.20 mole part.

EXAMPLE II

Different sets of test capacitors of the FIG. 2 construction were fabricated, with their ceramic bodies 20 formulated from the same compositions as set forth in Tests Nos. 1, 2, 5, 8, 10, 14–20, 21, 22, 25, 28, 30, 34, 36, 38, 40, 42 and 43 in Table 1. Each set of test capacitors were fabricated by first preparing a green (unfired) ceramic strip of the required composition. The strip was punched into squares.

Then an electroconductive paste composed of silver and palladium was coated in required patterns on one surface of each green ceramic square. Then five such coated green ceramic squares were stacked up, and this stack was placed between additional uncoated green ceramic squares. Then the complete stack of squares were bonded together under pressure. Then the stack was cut in a latticed pattern into chips of the required capacitor size.

Then the green ceramic chips were cofired with the electroconductive layers embedded therein, thereby obtaining the dielectric ceramic bodies 20 together with the film electrodes 22 and 24. Then the pair of conductive terminations 26 and 28 were formed on each ceramic body by coating a silver paste thereon and baking the coatings.

The sets of test capacitors of the various ceramic compositions according to the invention were then tested as to maximum specific dielectric constant, dielectric loss, resistivity, crystal grain size, and freedom from outsize grains, by the same methods as set forth in Example I. These properties of all the sets of test capacitors met the above described criteria.

POSSIBLE MODIFICATIONS

1. The major ingredient of the ceramic compositions according to the invention could be formulated by intermingling $BaTiO_3$ and $CaZrO_3$, $Ba(Ti_{1-y}Zr_y)O_3$ and $CaTiO_3$, and $BaTiO_3$ and $CaTiO_3$ and $BaZrO_3$, in the required proportions.

2. Dielectric ceramic bodies of the compositions according to the invention could be fired at any temperatures between 1000° and 1400° C.

3. Erbium compounds other than $Er_2O_3$, such as $Er(OH)_3$, could be employed as start materials of the dielectric ceramics according to the invention. Such other erbium compounds should be used in proportions of from about 0.1 to about 2.0 mole parts in terms of $Er_2O_3$ with respect 100 mole parts of the major ingredient.

4. Manganese compounds other than MnO could be used as start materials of the dielectric ceramics according to the invention. Examples include oxides such as $Mn_3O_4$, $Mn_2O_3$ and $MnO_2$, and hydroxides such as $Mn(OH)_2$ and $MnO(OH)$.

5. The firing of the mixture of the components of the major ingredient alone, as taught in the Examples above, is not an absolute necessity; instead, a mixture of, for example, $BaTiO_3$, $CaZrO_3$, $Er_2O_3$ and MnO, as well as ZnO and $SiO_2$ as required or desired, may be molded into desired shape, and the moldings may be fired.

What is claimed is:

1. A dielectric ceramic composition consisting essentially of:
(a) 100 mole parts of a major ingredient expressed by the formula, $$(Ba_{1-x}Ca_x)(Ti_{1-y}Zr_y)O_3,$$

where
x is a numeral in the range of about 0.01 to about 0.10, and
y is a numeral in the range of about 0.10 to about 0.24;
(b) from about 0.10 to about 2.0 mole parts of an erbium compound; and
(c) from about 0.03 to about 0.30 mole part of a manganese compound;
(d) 0-0.40 mole parts of a zinc compound; and
(e) 0-0.20 mole parts of a silicon compound.

2. The dielectric ceramic composition of claim 1 wherein the erbium compound is erbium oxide, and wherein the manganese compound is manganese oxide.

3. The dielectric ceramic composition of claim 1 wherein the proportion of the zinc compound is not less than about 0.03 mole part, and wherein the proportion of the silicon compound is not less than about 0.01 mole part.

4. The dielectric ceramic composition of claim 3 wherein the zinc compound is zinc oxide, and wherein the silicon compound is silicon oxide.

* * * * *